United States Patent
Nefcy et al.

(10) Patent No.: US 9,944,269 B2
(45) Date of Patent: Apr. 17, 2018

(54) INPUT TORQUE TRIM FOR TRANSMISSION SHIFT CONTROL DURING REGENERATIVE BRAKING

(71) Applicant: FORD GLOBAL TECHNOLOGIES, LLC, Dearborn, MI (US)

(72) Inventors: Bernard D. Nefcy, Novi, MI (US); Daniel Scott Colvin, Farmington Hills, MI (US); Felix Nedorezov, Rochester Hills, MI (US); Todd McCullough, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 179 days.

(21) Appl. No.: 14/686,054

(22) Filed: Apr. 14, 2015

(65) Prior Publication Data

US 2016/0304076 A1    Oct. 20, 2016

(51) Int. Cl.
| | |
|---|---|
| *B60W 10/08* | (2006.01) |
| *B60W 10/11* | (2012.01) |
| *B60W 20/00* | (2016.01) |
| *B60W 30/19* | (2012.01) |
| *B60W 30/18* | (2012.01) |
| *F16H 61/04* | (2006.01) |

(52) U.S. Cl.
CPC ............ *B60W 20/00* (2013.01); *B60W 10/08* (2013.01); *B60W 10/11* (2013.01); *B60W 30/18127* (2013.01); *B60W 30/19* (2013.01); *F16H 61/0403* (2013.01); *B60W 2510/1025* (2013.01); *B60W 2510/1095* (2013.01); *B60W 2710/021* (2013.01); *B60W 2710/083* (2013.01); *B60W 2710/1022* (2013.01); *F16H 2061/0422* (2013.01); *Y10S 903/93* (2013.01)

(58) Field of Classification Search
CPC ............... B60W 10/08; B60W 10/11; B60W 30/18127; B60W 30/19; B60W 2510/1005; B60W 2710/083; B60W 2710/1022; F16H 2061/0422
See application file for complete search history.

(56) References Cited

U.S. PATENT DOCUMENTS

| | | | |
|---|---|---|---|
| 6,526,343 B2 * | 2/2003 | Saito | ...... F16H 61/061 477/115 |
| 7,076,356 B2 | 7/2006 | Hubbard et al. | |

(Continued)

*Primary Examiner* — Ramya P Burgess
*Assistant Examiner* — David R Morris
(74) *Attorney, Agent, or Firm* — David Kelley; Brooks Kushman P.C.

(57) ABSTRACT

A system and method for controlling a step-ratio transmission gearshift during a regenerative braking event for a hybrid vehicle having an engine selectively coupled to an electric machine and an automatic transmission control transmission input torque based on a measured shift profile and a target shift profile. A torque trim term may be added to the transmission input torque or electric machine output torque in response to a difference between the measured and target shift profiles. The torque trim term may be used to modify the transmission input torque to speed the shift up or shorten the shift time if the measured shift is progressing too slowly. Likewise, the torque trim term may be used to reduce the transmission input torque or electric machine output torque if the shift is progressing too quickly relative to the target shift profile.

19 Claims, 2 Drawing Sheets

(56) References Cited

U.S. PATENT DOCUMENTS

| | | |
|---|---|---|
| 7,356,398 B2 | 4/2008 | Steinmetz et al. |
| 8,364,359 B2 * | 1/2013 | Takahashi ............ F16H 61/061 |
| | | 701/51 |
| 8,364,361 B2 | 1/2013 | Olson et al. |
| 8,473,170 B2 | 6/2013 | Stoller et al. |
| 8,591,378 B2 * | 11/2013 | Matsubara ............ B60K 6/445 |
| | | 477/15 |
| 8,738,254 B2 | 5/2014 | Lee et al. |
| 2012/0265382 A1 * | 10/2012 | Nefcy ................... B60W 10/06 |
| | | 701/22 |

* cited by examiner

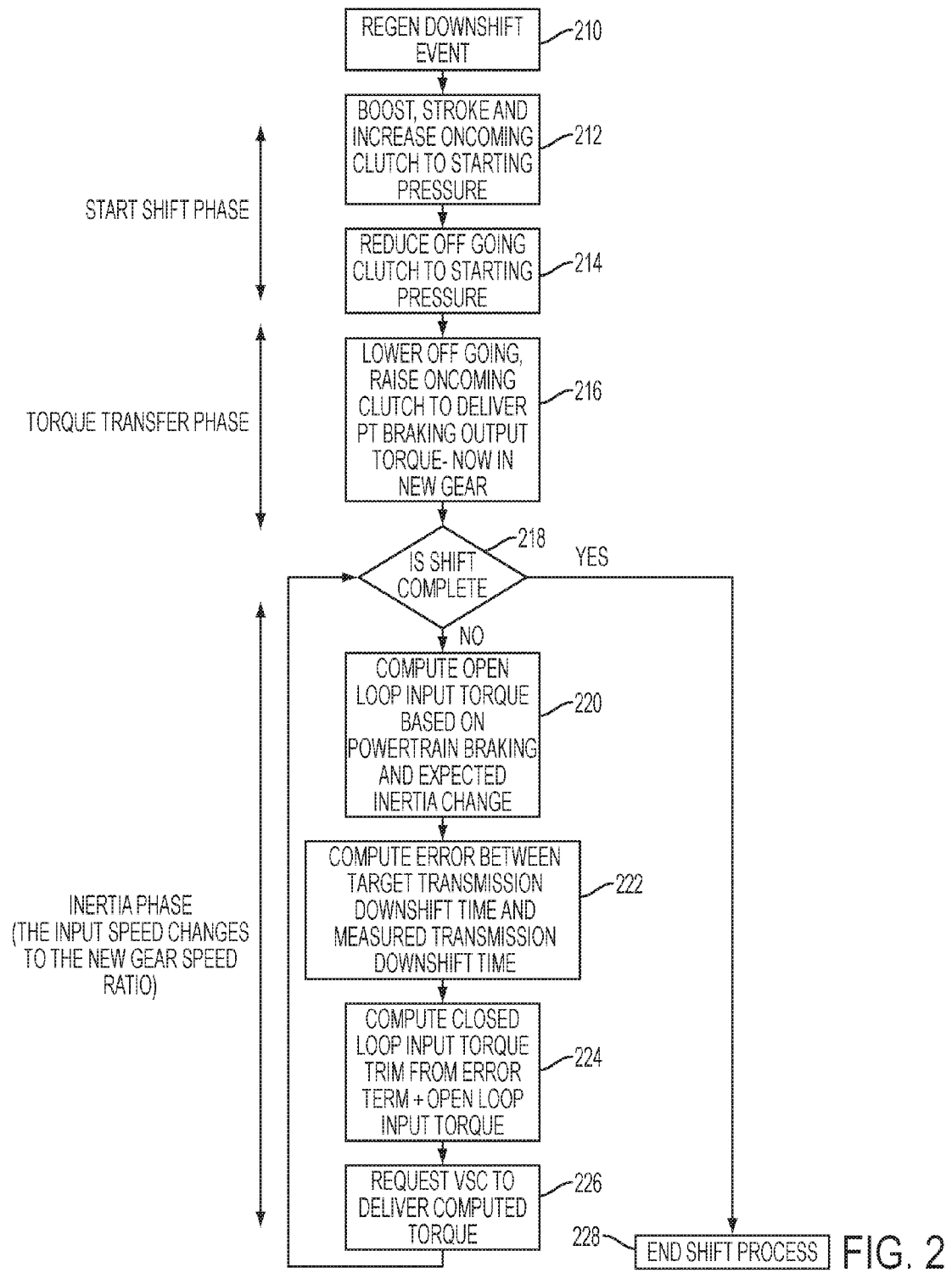

INPUT TORQUE TRIM FOR TRANSMISSION SHIFT CONTROL DURING REGENERATIVE BRAKING

TECHNICAL FIELD

This disclosure relates to control of transmissions in hybrid vehicles during regenerative braking.

BACKGROUND

Hybrid electric vehicles (HEV's) utilize a combination of an internal combustion engine and an electric motor to provide the power needed to propel the vehicle. This arrangement provides improved fuel economy over a vehicle that has only an internal combustion engine. A hybrid vehicle powertrain includes an electric machine, such as an electric motor/generator, that may be used to propel the vehicle either alone or in combination with torque produced by the engine. When operating as a generator, the electric machine generates electric power for use by the vehicle or storage in an associated battery. The engine and motor torques are transferred to vehicle drive wheels through a transmission.

Various powertrain configurations for electric and hybrid electric vehicles have been developed using various types of transmissions and gearing arrangements. One configuration for a hybrid vehicle uses a step-ratio transmission similar to a conventional automatic transmission or automated mechanical transmission and may be referred to as a Modular Hybrid Transmission (MHT) vehicle design. The engine is selectively coupled to the motor by a disconnect clutch with the motor selectively coupled to the transmission gear box by a launch clutch The launch clutch may be integrated with the transmission torque converter in some applications.

Most electric and hybrid vehicles include regenerative braking to improve efficiency and increase the range of the vehicle. During regenerative braking, kinetic energy of the vehicle is converted to electric energy that is used to charge the high voltage battery using the electric machine as a brake and generator. As the vehicle speed decreases, the step-ratio transmission may be downshifted to provide an appropriate gear ratio for the current vehicle speed and requested wheel torque.

Closed loop control of clutch pressure for at least one of the clutches involved in a gear or ratio change may be performed during transmission shifting to provide shift robustness and repeatability. During the ratio change, the associated clutch is "slipping" until the speeds on both sides of the clutch are equal, then the shift is completed. If the shift is proceeding too fast, pressure is removed from the clutch during this slipping phase to prevent a harsh or objectionable shift. Conversely, if the shift is proceeding too slowly, pressure is added to the clutch during this slipping phase. Because the torque transmission through the slipping clutch is proportional to the clutch pressure applied, adding or subtracting clutch pressure to control the speed or completion of the shift will change the output torque delivered to the vehicle wheels, possibly up to 10%. This may be tolerated in conventional vehicles where drivers expect a firmer shift during power-on shifting under positive torque (when accelerating, for example). Similarly, torque variation during shifting while coasting with slightly negative torque (when decelerating, for example) is difficult to detect because the shift is spread over a longer time period. However, in hybrid vehicles, transmission shifting during regenerative braking may become more objectionable using closed-loop clutch pressure control to manage the shift timing and associated shift quality or feel.

SUMMARY

A system and method is disclosed for improving shift quality during a downshift while regenerative braking for a hybrid vehicle having an engine selectively coupled to an electric machine (e.g., a motor) and an automatic transmission to control transmission input torque based on a measured shift profile and a target shift profile. Embodiments of this disclosure may be used in various shift control applications where improvement in shift quality is desired.

In one embodiment, a hybrid vehicle includes an engine selectively coupled to an electric machine by a first clutch with the electric machine coupled to a transmission by a second clutch. The vehicle also includes a controller configured to adjust a transmission input torque based on a difference between a target shift profile and a measured shift profile during a transmission gearshift event conducted while the hybrid vehicle is in a regenerative braking mode. The controller provides closed loop control of the transmission input torque with the input torque adjusted by an open-loop torque trim term, wherein the torque trim term is determined from the difference between the target shift profile and the measured shift profile. The transmission input torque may be controlled by controlling the output torque of the electric machine in response to the measured shift profile relative to the target shift profile for current operating conditions, which may include a vehicle operating mode, vehicle speed, and accelerator position or desired torque.

In another embodiment, a hybrid vehicle includes a transmission including multiple discrete gear ratios for delivering a requested or desired output torque to vehicle drive wheels. The hybrid vehicle also includes a controller configured to effect a gearshift between gear ratios during regenerative braking and modulate a transmission input torque based on a comparison of a target shift profile and a measured shift profile during an inertia phase of the gearshift. The transmission input torque may be modulated using a torque trim term determined from a difference between the target shift profile and the measured shift profile.

In yet another embodiment, a method for controlling a hybrid vehicle having an engine selectively coupled to a transmission and electric machine includes controlling the electric machine using closed-loop control to provide a transmission input torque corresponding to a requested transmission output torque upon completion of the gearshift. The transmission input torque may be controlled using closed-loop control, in response to a difference between a target shift profile and a measured shift profile, during an inertia phase of a transmission downshift event conducted when the hybrid vehicle is in a regenerative braking mode. The method also includes adjusting the transmission input torque by an open-loop torque trim term determined from the difference between the target shift profile and the measured shift profile.

Embodiments according to the present disclosure provide various advantages. For example, various embodiments reduce torque disturbances and improve overall shift quality of a hybrid vehicle. Moreover, the control strategies disclosed provide consistency in shifting that ensures robustness to various operating conditions. The above advantages and other advantages and features will be readily apparent

BRIEF DESCRIPTION OF THE DRAWINGS

FIG. 2 illustrates a flow chart describing a control sequence operation of a regenerative braking downshift control system and/or method in accordance with an embodiment of the present disclosure.

DETAILED DESCRIPTION

Figure 1:
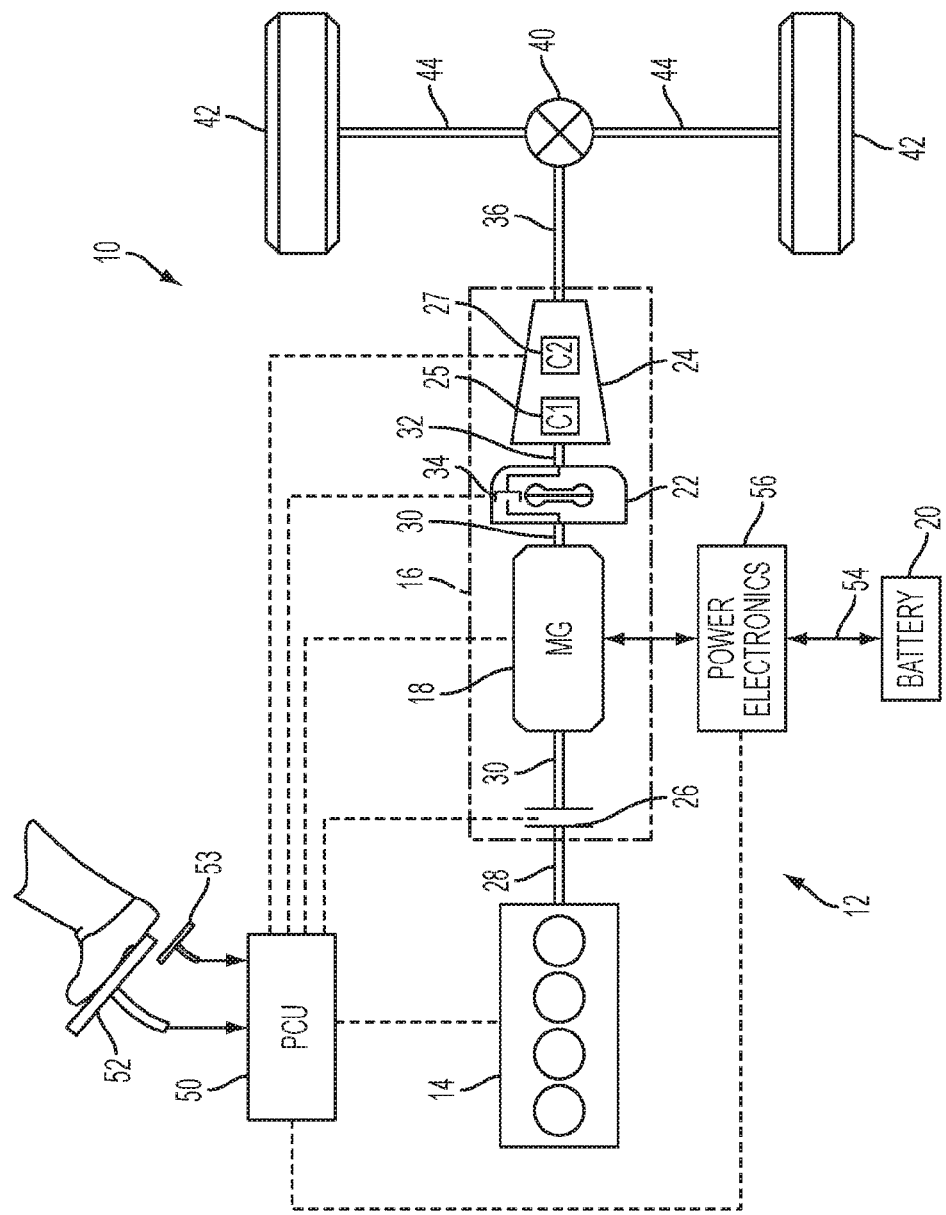
FIG. 1 illustrates a block diagram of an exemplary hybrid vehicle powertrain in accordance with an embodiment of the present disclosure.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Referring to FIG. 1, a schematic diagram of a hybrid electric vehicle (HEV) 10 is illustrated according to an embodiment of the present disclosure. FIG. 1 illustrates representative relationships among the components. Physical placement and orientation of the components within the vehicle may vary. The HEV 10 includes a powertrain 12. The powertrain 12 includes an engine 14 that drives a transmission 16, which may be referred to as a modular hybrid transmission (MHT). As will be described in further detail below, transmission 16 includes an electric machine such as an electric motor/generator (M/G) 18, an associated traction battery 20, a torque converter 22, and a multiple step-ratio automatic transmission, or gearbox 24.

The engine 14 and the M/G 18 are both drive sources for the HEV 10. The engine 14 generally represents a power source that may include an internal combustion engine such as a gasoline, diesel, or natural gas powered engine, or a fuel cell. The engine 14 generates an engine power and corresponding engine torque that is supplied to the M/G 18 when a disconnect clutch 26 between the engine 14 and the M/G 18 is at least partially engaged. The M/G 18 may be implemented by any one of a plurality of types of electric machines. For example, M/G 18 may be a permanent magnet synchronous motor. Power electronics 56 condition direct current (DC) power provided by the battery 20 to the requirements of the M/G 18, as will be described below. For example, power electronics may provide three phase alternating current (AC) to the M/G 18.

When the disconnect clutch 26 is at least partially engaged, power flow from the engine 14 to the M/G 18 or from the M/G 18 to the engine 14 is possible. For example, the disconnect clutch 26 may be engaged and M/G 18 may operate as a generator to convert rotational energy provided by a crankshaft 28 and M/G shaft 30 into electrical energy to be stored in the battery 20. The disconnect clutch 26 can also be disengaged to isolate the engine 14 from the remainder of the powertrain 12 such that the M/G 18 can act as the sole drive source for the HEV 10. Shaft 30 extends through the M/G 18. The M/G 18 is continuously drivably connected to the shaft 30, whereas the engine 14 is drivably connected to the shaft 30 only when the disconnect clutch 26 is at least partially engaged.

The M/G 18 is connected to the torque converter 22 via shaft 30. The torque converter 22 is therefore connected to the engine 14 when the disconnect clutch 26 is at least partially engaged. The torque converter 22 includes an impeller fixed to M/G shaft 30 and a turbine fixed to a transmission input shaft 32. The torque converter 22 thus provides a hydraulic coupling between shaft 30 and transmission input shaft 32. The torque converter 22 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch 34 may also be provided that, when engaged, frictionally or mechanically couples the impeller and the turbine of the torque converter 22, permitting more efficient power transfer. The torque converter bypass clutch 34 may be operated as a launch clutch to provide smooth vehicle launch. Alternatively, or in combination, a launch clutch similar to disconnect clutch 26 may be provided between the M/G 18 and gearbox 24 for applications that do not include a torque converter 22 or a torque converter bypass clutch 34. In some applications, disconnect clutch 26 is generally referred to as an upstream clutch and launch clutch 34 (which may be a torque converter bypass clutch) is generally referred to as a downstream clutch.

As described in greater detail below, transmission input torque may be controlled using closed-loop control with an open-loop torque trim term or parameter during a gearshift of gearbox 24. An input torque sensor (not shown) may be provided to measure transmission input torque corresponding to the impeller torque. Alternatively, transmission input torque may be calculated based on various operating parameters, such as the torque converter speed ratio, transmission input shaft speed, M/G 18 output shaft 30 speed, M/G 18 current or torque, etc. Transmission input torque may be controlled by controlling torque produced by engine 14 and/or M/G 18. In various embodiments, transmission input torque is controlled by controlling output torque of M/G 18 as the M/G responds much faster than engine 14 to torque requests from PCU 50. Depending on the particular operating mode, engine 14 may be disconnected via clutch 26 or may be controlled to provide substantially constant output torque with M/G 18 controlled to modulate the transmission input torque.

The gearbox 24 may include gear sets (not shown) that are selectively placed in different gear ratios by selective engagement of friction elements 25, 27 to establish the desired multiple discrete or step drive ratios. The friction elements 25, 27 are controllable through a shift schedule that connects and disconnects certain elements of the gear sets to control the ratio between a transmission output shaft 36 and the transmission input shaft 32. The gearbox 24 is automatically shifted from one ratio to another based on various vehicle and ambient operating conditions by an associated controller, such as a powertrain control unit (PCU) 50. The gearbox 24 then provides powertrain output torque to output shaft 36.

It should be understood that the hydraulically controlled gearbox 24 used with a torque converter 22 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 36 is connected to a differential 40. The differential 40 drives a pair of wheels 42 via respective axles 44 connected to the differential 40. The differential transmits approximately equal torque to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 12 further includes an associated powertrain control unit (PCU) 50. While illustrated as one controller, the PCU 50 may be part of a larger control system and may be controlled by various other controllers throughout the vehicle 10, such as a vehicle system controller (VSC). It should therefore be understood that the powertrain control unit 50 and one or more other controllers can collectively be referred to as a "controller" that controls various actuators in response to signals from various sensors to control functions such as starting/stopping engine 14, operating M/G 18 to provide positive or negative wheel torque or charge battery 20, select or schedule transmission shifts, etc. Controller 50 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, PCU 50 may communicate signals to and/or from engine 14, disconnect clutch 26, M/G 18, launch clutch 34, transmission gearbox 24, and power electronics 56. Although not explicitly illustrated, those of ordinary skill in the art will recognize various functions or components that may be controlled by PCU 50 within each of the subsystems identified above. Representative examples of parameters, systems, and/or components that may be directly or indirectly actuated using control logic executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging, regenerative braking, M/G operation, clutch pressures for disconnect clutch 26, launch clutch 34, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), brake pedal position (BPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), transmission input torque, torque converter bypass clutch 34 status (TCC), deceleration or shift mode (MDE), for example.

In some applications, engine 14 may be connected to a starter motor (not shown) used to start engine 14. In other applications, engine 14 is started by selective coupling to M/G 18. Automatic engine starting may be referred to as an engine pull-up and automatic engine stopping may be referred to as an engine stop or pull down. When provided, a starter motor may be connected to traction battery 20 and may also be used as a generator to produce electric energy for storage in battery 20.

Control logic or functions performed by PCU 50 may be represented by flow charts or similar diagrams in one or more figures. These figures provide representative control strategies and/or logic that may be implemented using one or more processing strategies such as event-driven, interrupt-driven, multi-tasking, multi-threading, and the like. A closed-loop or feedback controller may be implemented by control logic, functions, or software executed by PCU 50 or other hardware controller having a microprocessor. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as PCU 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

One or more pedals 52, 53 may be used by the driver of the vehicle to indicate a desired output torque, which may be positive, negative, or zero. For example, an accelerator pedal 52 may be used by the driver of the vehicle to provide a demanded torque, power, or drive command to propel or slow the vehicle. In general, depressing and releasing the pedal 52 generates an accelerator pedal position signal that may be interpreted by the controller 50 as a demand for increased power or decreased power (or braking, sometimes referred to as engine braking), respectively. Similarly, depressing and releasing brake pedal 53 generates a brake pedal position signal that may be interpreted by the controller 50 as a demand for increased or decreased braking, which may include regenerative braking by M/G 18 and/or vehicle friction brakes (not shown). Based at least upon input from the pedal, the controller 50 commands torque from the engine 14 and/or the M/G 18. The controller 50 also controls the timing of gear shifts within the gearbox 24, as well as engagement or disengagement of the disconnect clutch 26 and the torque converter bypass clutch 34. Like the disconnect clutch 26, the torque converter bypass clutch 34 can be modulated across a range between the engaged and disengaged positions. This produces a variable slip in the torque converter 22 in addition to the variable slip produced by the hydrodynamic coupling between the impeller and the turbine. Alternatively, the torque converter bypass clutch 34 may be operated as locked or open without using a modulated operating mode depending on the particular application.

To drive the vehicle with the engine 14, the disconnect clutch 26 is at least partially engaged to transfer at least a portion of the engine torque through the disconnect clutch 26 to the M/G 18, and then from the M/G 18 through the torque converter 22 and gearbox 24. The M/G 18 may assist the engine 14 by providing additional power to turn the shaft 30. This operation mode may be referred to as a "hybrid mode" or an "electric assist mode."

To drive the vehicle with the M/G 18 as the sole power source, the power flow remains the same except the disconnect clutch 26 isolates the engine 14 from the remainder of the powertrain 12. Combustion in the engine 14 may be disabled or otherwise OFF during this time to conserve fuel. The traction battery 20 transmits stored electrical energy through wiring 54 to power electronics 56 that may include an inverter, for example. The power electronics 56 convert DC voltage from the battery 20 into AC voltage to be used by the M/G 18. The PCU 50 commands the power electronics 56 to convert voltage from the battery 20 to an AC voltage provided to the M/G 18 to provide positive or negative torque to the shaft 30. This operation mode may be referred to as an "electric only" operation mode.

In any mode of operation, the M/G 18 may act as a motor and provide a driving force for the powertrain 12. Alternatively, the M/G 18 may act as a generator and convert kinetic energy from the powertrain 12 into electric energy to be stored in the battery 20. The M/G 18 may act as a generator while the engine 14 is providing propulsion power for the vehicle 10, for example. The M/G 18 may additionally act as a generator when operating in a regenerative braking mode, for example, in which rotational energy from vehicle inertia is transferred back through wheels 42, transaxles 44, differential 40, and output shaft 36 to the gearbox 24 and is converted into electrical energy for storage in the battery 20.

PCU 50 may be used to apportion the total wheel braking torque between a powertrain braking torque signal representing the amount of torque to be obtained by regenerative braking and a friction braking torque signal representing the amount of torque to be obtained through the vehicle friction brakes. For regenerative braking, PCU 50 may generate a motor torque signal for M/G 18 representing the requisite amount of motor (negative) torque to be provided by regenerative braking. In turn, M/G 18 generates the regenerative braking torque and thereby supplies a negative input torque to transmission 16. The transmission input torque may be controlled in response to a difference between a desired or target shift profile and a current or measured shift profile during a transmission downshift performed when in a regenerative braking mode.

It should be understood that the schematic illustrated in FIG. 1 is merely exemplary and is not intended to be limiting. Other configurations are contemplated that utilize selective engagement of both an engine and a motor to transmit torque through the transmission and control transmission input torque according to the present disclosure. For example, the M/G 18 may be offset from the crankshaft 28, an additional motor may be provided to start the engine 14, and/or the M/G 18 may be provided between the torque converter 22 and the gearbox 24. Other configurations are contemplated without deviating from the scope of the present disclosure.

As previously described, transmission 16 includes a gearbox 24 having several gear sets (not shown) that are selectively operated to provide different gear ratios between the transmission input and output shafts by selective engagement of a plurality of friction elements 25, 27 associated with the various gears or gear sets. For any particular gearshift or ratio change, the friction elements 25, 27 of gearbox 24 may include an on-coming friction element 25 (e.g., an on-coming clutch (OCC)), and an off-going friction element 27 (e.g., an off-going clutch (OGC)). The friction elements 25, 27 of gearbox 24 may be engaged and disengaged by controlling hydraulic pressure applied to the friction elements 25, 27.

During a gearshift, hydraulic pressure is applied to the OCC 25 to stroke the clutch so that it begins to transmit torque. Additional pressure will increase the torque carrying or transmission characteristics of the clutch and is applied while decreasing the hydraulic pressure applied to the OGC 27. Various prior art strategies provide closed-loop pressure control during gearshifts to control the shift completion time and shift feel to the vehicle occupants. During shifting, the clutch pressure of one of the friction elements 25, 27 involved in the gear change is used in closed-loop control for shift robustness and repeatability. This clutch is "slipping" and slips until the speeds on both sides of the clutch are equal, at which time the shift is completed. If the shift progresses too quickly, pressure is removed from the clutch during this slipping phase. Conversely if the shift progresses too slowly, pressure is added to the clutch during this slipping phase. The present disclosure recognizes that adding or subtracting pressure will change the torque transmitted by the clutch and the corresponding output torque, which may be acceptable for many vehicles, but may be objectionable in hybrid vehicle applications, particularly when gearshifts occur during regenerative braking. As such, various embodiments of the present disclosure provide closed-loop control of the transmission input torque to control shift completion. Closed-loop control of the transmission input torque may be provided alone or in combination with closed-loop pressure control of one or more transmission clutches. An open-loop transmission input torque trim may be provided to the closed-loop input torque controller based on a difference between a desired or target shift profile and a current or measured shift profile as a function of elapsed shift time or shift completeness. PCU 50 may stroke the OCC 25 and set the hydraulic pressure of the OCC 25 to transmit or carry the desired output torque upon shift completion at the new gear ratio.

A transmission downshift may be requested during regenerative braking energy as the higher input speed of gearbox 24 allows for greater regenerative braking power, usually at higher efficiencies. The standard shift schedule may be modified during a regenerative braking event to downshift sooner so that more power can be collected at a better efficiency.

In one embodiment, hybrid vehicle 10 includes an internal combustion engine 14 coupled to electric machine 18 by a first clutch 26, with electric machine 18 coupled to a transmission gearbox 24 having multiple discrete gear ratios by a second clutch 34. Controller (PCU) 50 is configured to control transmission input torque to effect a transmission gearshift between two gear ratios during regenerative braking in response to a difference between a target shift profile and a measured shift profile as explained in greater detail below. The controller 50 may modulate or control transmission input torque using an open-loop torque trim term determined from a difference in the target shift profile and the measured shift profile. Controller 50 may also be configured to control hydraulic pressure of an oncoming clutch of gearbox 24 based on requested output torque, and may provide closed-loop pressure control of at least one of the friction elements 25, 27, such as the OGC 27 or OCC 25 associated with the gearshift. PCU 50 may also be configured to modulate the transmission input torque to compensate for variations caused by regenerative braking during the gearshift.

Turning now to FIG. 2, there is shown a flowchart illustrating operation of a system or method for controlling a hybrid vehicle to improve shift quality and reduce disturbances during a downshift event occurring while regenerative braking. In general, embodiments of the present disclosure provide control strategies for setting up the oncoming clutch pressure (torque capacity) to carry the requested torque to the output shaft (after shift completion) and to perform closed-loop control of the input torque so that the shift completes at the expected time. In one embodiment, an error term is created by specifying the percent shift complete profile versus time for each shift, and comparing that with the actual, measured percent shift complete. This error term is used to generate a trim torque on an open loop input torque profile. The open loop input torque profile is calibrated to produce driver demand plus any inertia torque compensation. If nominal conditions exist, the shift is intended to progress at the specified percent shift complete versus time profile. If the shift progress too slowly, the closed loop trim will be added to the input torque to speed the shift up by increasing the input torque above nominal, where it is understood that this is a negative input torque that becomes less negative. Conversely, if the shift progresses too quickly, the closed-loop trim will lower the input torque below nominal. The nominal values may be specified or determined based on current vehicle operating conditions, such as vehicle speed, requested torque, engine speed, etc. In particular, control strategies in accordance with embodiments of the present disclosure adjust the transmission input torque based on a difference between a measured shift profile and a target shift profile. Transmission input torque may be controlled or adjusted by corresponding control of the output torque of M/G 18.

Those of ordinary skill in the art will understand, the functions represented in FIG. 2 may be performed by software and/or hardware depending on the particular application and implementation. The various functions may be performed in an order or sequence other than illustrated in FIG. 2 depending upon the particular processing strategy, such as event-driven, interrupt-driven, etc. Similarly, one or more steps or functions may be repeatedly performed, performed in parallel, and/or omitted under particular operating conditions or in particular applications, although not explicitly illustrated. In one embodiment, the functions illustrated are primarily implemented by software, instructions, or code stored in a computer readable storage device and executed by one or more microprocessor-based computers or controllers to control operation of the vehicle.

More specifically, in FIG. 2, the control strategy begins when a downshift during regenerative braking is triggered, as shown at block 210. The gearshift process generally includes various phases generally understood by those of ordinary skill in the art including an initiation or start phase, a torque transfer phase, and an inertia phase. During the start of the shift phase, the controller requests boosting and stroking of the oncoming clutch (OCC), as indicated at block 212. Next, the off-going clutch (OGC) pressure is reduced to starting pressure just sufficient to hold input torque, as shown at block 214. After this starting/first phase of the downshift, the torque transfer phase begins. During the torque transfer phase, the speed ratio begins to change from the current or pre-shift ratio to the target or post-shift ratio. During the torque transfer phase, the OGC begins releasing and reducing/lowering its torque capacity while the OCC continues increasing its torque capacity, as shown at 216. This results in the input torque transferring from the OGC to the OCC (OCC now in gear).

Next, the control strategy checks to see if the shift event has completed at block 218. If yes, then the control strategy ends at block 228. If the shift has not ended at block 218, then the shift proceeds through the inertia phase where the vehicle inertia coupled through the output shaft 36 is transferred back through the powertrain. In the inertia phase, the OCC continues to control the transmission input speed up to the new speed ratio i.e. the input speed of the transmission increases as the transmission downshifts because of the speed ratio increase. As shown at block 220, the control strategy then computes an open-loop input torque trim based on powertrain braking and expected inertia change. An inertia effect from the ratio speed increase will, if not compensated for, show up as a dip in powertrain torque, as well as a dip in wheel torque that, in turn, is felt as a shift shock.

As also shown in FIG. 2 as represented at block 222, the control strategy computes a difference (or error) between a measured shift profile and a target shift profile. In one embodiment, the measured shift profile and the target shift profile are based on a percentage completion of the shift as a function of elapsed shift time. Other metrics may be used to compare a measured gearshift to a target or desired gearshift and to adjust transmission input torque trim in response. For example, elapsed time for each phase of the shift may be computed and compared to an expected, desired, or nominal time. The expected or nominal time for each phase or for shift completion may vary based on various operating parameters, such as requested torque and vehicle speed, for example. At block 224, the control strategy computes an input torque trim term based on the difference between the measured and target shift profiles (or error term). The torque trim may be determined using a lookup table and/or calculated based on the difference or error term. The torque trim term is added to the open loop input torque calculated, as shown in block 220. The PCU 50 then controls M/G 18 to deliver the requested transmission input torque computed at block 224 to ensure a smooth shift. This process, as shown in blocks 220-226, is repeated until the shift event has completed.

If nominal conditions exist, the shift is intended to progress at the specified percent shift complete versus time profile. As such, if the shift progresses too slowly, the torque trim term will be added to the input torque to decrease the shift time. Likewise, if the shift progresses too quickly, the torque trim term will lower the input torque below its nominal value for current operating conditions (requested torque, vehicle speed, etc.) to stretch or lengthen the shift and avoid a harsh or abrupt shift resulting in an objectionable disturbance to the vehicle occupants.

As shown above, embodiments according to the present disclosure improve shift quality during a regenerative braking event. Additionally, consistency is provided such that if a vehicle encounters a road disturbance, such as a pothole, causing shift time disturbances or operating conditions such as temperature and varying load conditions to occur, the shift times will be able to be controlled to the target rate (i.e., expected percent shift complete versus time profile). Moreover, this consistency will ensure robustness by not having to shift too fast or slow to adversely wear clutches over lifetime of vehicle use.

It is to be understood that this disclosure is not limited to the exact shift control methods which have been illustrated and described in the representative embodiments, but that various modifications may be made without departing from the spirit and the scope of the invention. It is to be understood that various embodiments may combine a conventional shift control method for adjusting input torque through a closed-loop, an open-loop or an adaptive strategy alone or in combination with traditional pressure control including pressure feedback for balancing the reduction of torque disturbances with desired shift quality and drivability targets.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure. While the best mode has been described in detail, those familiar with the art will recognize various alternative designs and embodiments within the scope of the following claims. While various embodiments may have been described as providing advantages or being preferred over other embodiments with respect to one or more desired characteristics, as one skilled in the art is aware, one or more characteristics may be compromised to achieve desired system attributes, which depend on the specific application and implementation. These attributes include, but are not limited to: cost, strength, durability, life cycle cost, marketability, appearance, packaging, size, serviceability, weight, manufacturability, ease of assembly, etc. The embodiments discussed herein that are described as less desirable than other embodiments or prior art implementations with respect to one or more characteristics are not outside the scope of the disclosure and may be desirable for particular applications.

What is claimed is:

1. A hybrid vehicle, comprising:
an electric machine coupled to an engine and a transmission by first and second clutches, respectively; and
a controller configured to, responsive to a transmission downshift request during regenerative braking, adjust a transmission input torque by a torque trim term determined by the controller based on a difference between a target shift time determined by the controller and a shift time measured by the controller for completing the transmission downshift.

2. The hybrid vehicle of claim 1 wherein the controller is further configured to control pressure of a transmission friction element during the transmission downshift based on a requested transmission output torque.

3. The hybrid vehicle of claim 1, wherein the controller is configured to control the transmission input torque based on a driver demand and an expected inertia torque compensation associated with the transmission downshift during an inertia phase of the transmission downshift.

4. The hybrid vehicle of claim 1, wherein the controller controls an output torque of the electric machine to adjust the transmission input torque by the torque trim term.

5. The hybrid vehicle of claim 1, wherein the controller is configured to adjust the transmission input torque by increasing an output torque of the electric machine in response to the shift time measured by the controller being less than the target shift time.

6. The hybrid vehicle of claim 1, wherein the controller reduces an output torque of the electric machine to decrease the transmission input torque in response to the shift time measured by the controller being greater than the target shift time.

7. The hybrid vehicle of claim 1, wherein the target shift time is based on current vehicle operating conditions including at least one of a vehicle speed, a requested transmission output torque and an engine speed.

8. A hybrid vehicle, comprising:
an engine;
an electric machine coupled to the engine by a first clutch;
a transmission including multiple discrete gear ratios coupled to the electric machine by a second clutch; and
a controller configured to increase an electric machine output torque responsive to a downshift being requested during a regenerative braking event and a downshift time measured by the controller being less than a target downshift time determined by the controller.

9. The hybrid vehicle of claim 8, wherein the controller modulates a transmission input torque using a torque trim term determined from a difference in the target downshift time and the downshift time measured by the controller.

10. The hybrid vehicle of claim 9, wherein the controller is configured to provide pressure control of a transmission friction element based on a requested transmission output torque.

11. The hybrid vehicle of claim 8, wherein the controller is further configured to reduce the electric machine output torque in response to the downshift being requested during the regenerative braking event and the downshift time measured by the controller being greater than the target downshift time.

12. The hybrid vehicle of claim 8, wherein the target downshift time determined by the controller is based on current vehicle operating conditions including at least one of a vehicle speed, a requested transmission output torque, and an engine speed.

13. A method for controlling a hybrid vehicle having an electric machine coupled by first and second clutches to an engine and a transmission, respectively, comprising:

responsive to a downshift being requested during regenerative braking, modulating a transmission input torque by a torque trim term determined by a controller based on a difference between a target shift time determined by the controller and a shift time measured by the controller for completion of the downshift.

14. The method of claim 13, wherein the target shift time is based on current vehicle operating conditions including at least one of a vehicle speed, a requested transmission output torque, and an engine speed.

15. The method of claim 13, wherein the transmission input torque is modulated by an output torque from the electric machine, wherein the output torque of the electric machine is based on a powertrain braking request and an expected inertia change associated with the transmission downshift during an inertia phase of the transmission downshift.

16. The method of claim 13, further comprising:
reducing an electric machine output torque in response to the shift time measured by the controller being greater than the target shift time.

17. The method of claim 13, further comprising:
increasing an electric machine output torque in response to the shift time measured by the controller being less than the target shift time.

18. The method of claim 13 further comprising:
stroking a first transmission friction element during a starting phase of the downshift; and
reducing hydraulic pressure of a second transmission friction element during the starting phase of the downshift.

19. The method of claim 13 wherein the second clutch is engaged during the downshift.

* * * * *